Dec. 3, 1963  J. R. JASSE  3,112,674
MORTAR WITHOUT RECOIL BRAKE
Filed June 27, 1961   10 Sheets-Sheet 1

Dec. 3, 1963 J. R. JASSE 3,112,674
MORTAR WITHOUT RECOIL BRAKE
Filed June 27, 1961 10 Sheets-Sheet 5

Dec. 3, 1963    J. R. JASSE    3,112,674
MORTAR WITHOUT RECOIL BRAKE
Filed June 27, 1961    10 Sheets-Sheet 10

United States Patent Office 3,112,674
Patented Dec. 3, 1963

3,112,674
MORTAR WITHOUT RECOIL BRAKE
Joseph Raymond Jasse, Paris, France, assignor to Hotchkiss-Brandt, Paris, France, a French body corporate
Filed June 27, 1961, Ser. No. 119,862
Claims priority, application France June 28, 1960
21 Claims. (Cl. 89—37)

The present invention relates to artillery devices constituted by mortars of the type having no recoil brake in which the reaction upon firing is transmitted to the ground by a base plate on which the rear of the gun tube bears.

In known mortars of this type the gun tube is maintained in the correct firing position by a biped fixed to the tube at the muzzle end of the latter by a collar pivoted to the gun laying or pointing screw carried by the biped. The latter carries the aiming controls (elevation, direction, out of true) and a disconnecting device which permits a certain recoil travel of the gun tube upon firing without shifting the biped, the disconnecting device being returned to its initial position by elastically yieldable means.

Such an arrangement is more particularly suitable for light artillery weapons whose component parts: base plate, gun tube, biped, can be easily handled by one man, but in the case of heavy artillery there are certain drawbacks in this arrangement.

The principal drawback resides in the danger of the sliding of the feet of the biped which could result in the gun tube dropping or overturning.

Another drawback is encountered when the base plate sinks into the ground to a great extent upon firing. In this event the disconnecting device is liable to move toward the end of its travel and produce a shock when it reaches the end of the latter. Upon the return of the disconnecting device to its initial position, there is found a modification in the elevation of the mortar which is the greater as the sinking of the base plate is greater.

Furthermore, when it concerns a weapon which is capable of being fixed on a biped and comprises a wheeling set of wheels, putting the weapon into firing position and into position for transporting after firing requires certain precautions owing to the fact that the biped is pivoted to the collar fixed to the gun tube by means of a nut mounted on the direction laying aiming screw so that this biped is swingable relative to the gun tube.

The object of the invention is to provide a mortar without a recoil brake so improved as to avoid the aforementioned drawbacks. In the mortar according to the invention which does not comprise a biped and in which the gun tube bears, in the firing position, through the medium of a ball or swivel joint provided at its rear end, on a base plate anchored in the ground, the gun tube bears furthermore on a gun carriage assembly having a supporting and wheeling set of wheels, the axis of the wheels being adjustable in position relative to the carriage assembly.

Adjustment of said position varies the elevation, that is, the firing angle.

The carriage assembly is so arranged that the axis of the wheels of the supporting set of wheels can be moved toward or away from the gun tube and/or shifted along the latter.

If both adjusting means are provided, one of them (for example the first means) permits a rough setting of the laying for elevation, the other means (the second means) permitting the fine setting of this laying.

According to one embodiment of the invention, on the one hand, the supporting set of wheels comprises an axle which is rotatably mounted in a tubular element of the gun carriage assembly and terminates in two support arms carrying the stub axles of the wheels, so that by rotating the axle in said tubular element it is possible to vary the position of the axis of the wheels relative to the gun tube and, on the other hand, there is mounted for sliding motion along the gun tube a collar which is transversely movable on a cradle which forms part of the gun carriage assembly and with which the collar constitutes a triangulated system.

Further features and advantages of the invention will be apparent from the ensuing description, with reference to the accompanying drawings to which the invention is in no way limited.

I. *Brief Description of the Mortar (FIGS. 1 to 5)*

In the illustrated embodiment, the mortar comprises a gun tube A loaded through the muzzle 1. This gun tube has an axis U—U and rests on the ground through two support devices.

The first of these support devices constitutes a gun carriage assembly having a supporting set of wheels which is movable along the gun tube A and whose axis V—V corresponding to the wheels 2 is adjustable relative to the axis U—U of the tube A.

This carriage assembly comprises a collar B movable along the tube A by means of a device C which provides a fine setting of the aiming or laying the mortar for elevation. This collar rests on a cradle D along which it is movable transversely by means of a device for aiming or laying the mortar for direction E. Further, the collar B forms with the cradle a triangulated support system owing to provision of an elastically yieldable disconnecting device F.

The cradle D is mounted on a support G for pivotal movement about an inclined axis W—W contained in the vertical longitudinal plane of symmetry of the carriage assembly. It is also connected to the cradle support by a lateral device H whose length is adjustable and which permits rendering the cradle D horizontal irrespective of the transverse obliqueness of the support G.

Journalled in the cradle support G for movement about the axis X—X parallel with the axis V—V of the wheels 2, is the axle 3 of the supporting set of wheels I. The axis V—V of the wheels 2 is eccentric relative to the axis X—X of the axle and this axle can be turned in the cradle support G about its axis X—X by a device J which effects a rough setting of the laying of the mortar for elevation.

Rotation of the axle 3 about its axis causes the axis V—V of the wheels 2 to describe a cylindrical surface concentric with the axis X—X.

The second support device for the gun tube A is of the known type having a base plate K anchored in the ground and against which the tube A bears through the medium of a ball swivel joint L which permits oscillations of the tube substantially throughout the hemisphere situated above the upper plane of the base plate.

Figure 4:
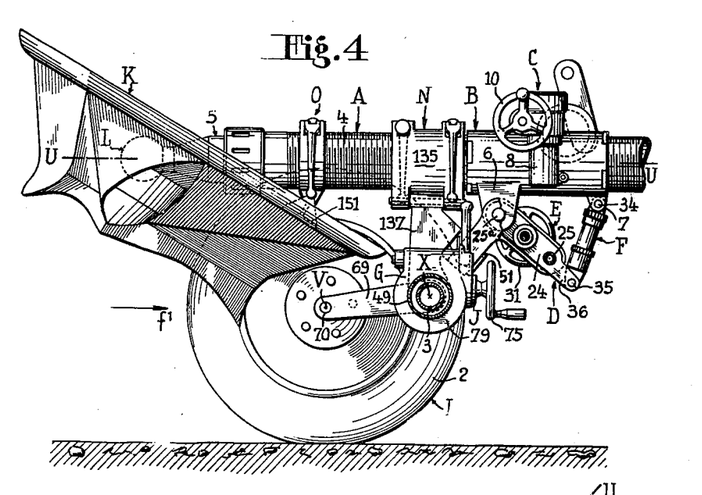
FIG. 4 is an elevational view of the mortar in the transporting position on a scale larger than that of FIGS. 1 and 3.

The assembly just described is completed by:

A mortar laying or pointing apparatus M and its support;

A device N for rendering the gun tube A stationary relative to the cradle D when transporting (FIG. 4);

A device O for fixing the base plate K to the gun tube A as shown in FIG. 4 when transporting.

II. *Operation of the Assembly*

Figure 1:
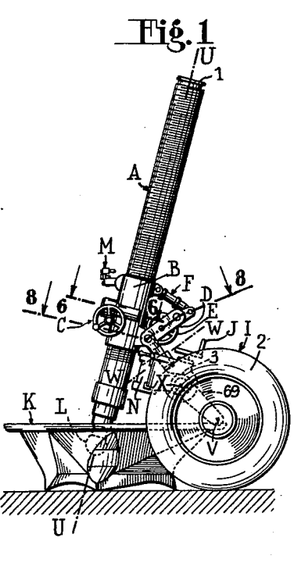
FIG. 1 is an elevational view of the mortar improved in accordance with the invention in a position for firing at a large angle of elevation with the base plate placed on the ground.
Figure 2:
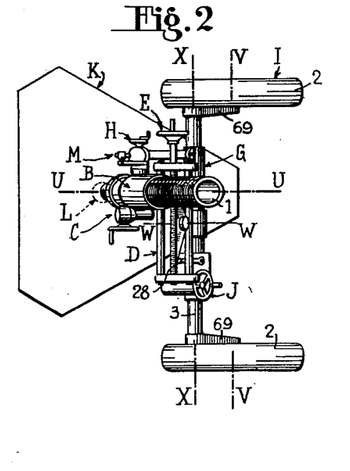
FIGS. 2 and 3 are corresponding rear and plan views respectively.
Figure 3:
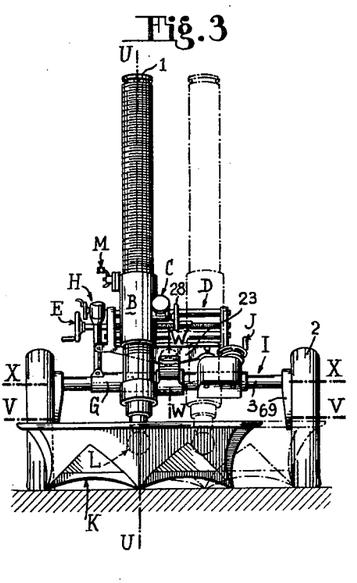
Figure 5:
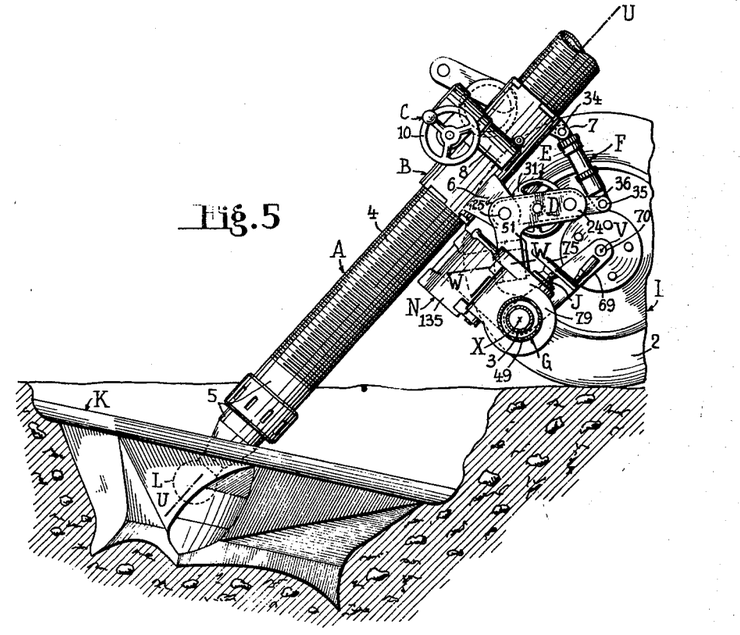
FIG. 5 is an elevational view of the mortar in a position for firing at an angle of elevation of about 45° with its base plate sunk into the ground.

As will be understood, the laying or pointing of the mortar for elevation depends on the vertical position of the axis V—V of the wheels 2 relative to the axis X—X of the axle 3, and on the position of the collar B—that is, the position of the carriage assembly—along the gun tube A (compare, for example, the positions shown in FIGS. 1 and 5). Thus the laying for elevation can be roughly obtained by means of the device J which adjusts the relative positions of the axes V—V and X—X, the fine setting being accomplished by the device C which shifts the collar B along the gun tube A.

FIG. 1 shows the gun tube in almost vertical position, the axis V—V of the wheels being lower than the axis X—X of the axle and the collar B being relatively near to the rear ball joint L. In FIG. 5, the gun tube is much nearer to the horizontal since the axis of the wheels is higher than that of the axle and the collar B is located nearer the muzzle 1 of the tube A.

For laying or pointing the mortar for direction, the collar B on the cradle D which has been previously rendered horizontal by the device H, is shifted transversely by means of the traversing device E for laying the mortar for direction.

III. *Detailed Description*

Each of the parts A to O of the mortar will now be described in detail.

The gun tube A comprises (FIGS. 1 to 3) a muzzle 1, a screw thread 4 (FIGS. 4 and 5) which constitutes a rack, the latter being formed in an extremely simple manner by a small-pitch helical thread. Adjacent the screw, there is a smooth rear portion which is extended by the breech 5 which latter terminates in the swivel joint ball L. The gun tube can have a rifled bore if desired.

The collar B is adapted to move along the gun tube A and consists of a cylindrical sleeve having two lugs 6 (FIGS. 4, 5 and 8, 9) slidable along the cradle D, and a fork 7 for the pivotal mounting of the disconnecting device F. This collar is slidable along the tube A by means of the device C which effects the fine setting when laying the mortar for elevation.

This device C (FIGS. 4 to 7) comprises a case in two parts 8, 8ᵃ, attached by welding or otherwise, to the collar B. Screw-threadedly mounted in the part 8ᵃ is a worm 9 one of the journals of which carries outside the case a hand-wheel 10 for the fine setting when laying the mortar for direction. This worm 9 is meshed with a worm wheel 11 for transmitting motion in one direction only, this worm wheel being rotatably mounted by a sleeve 12 in a bearing 13 formed in the case 8.

Figure 6:
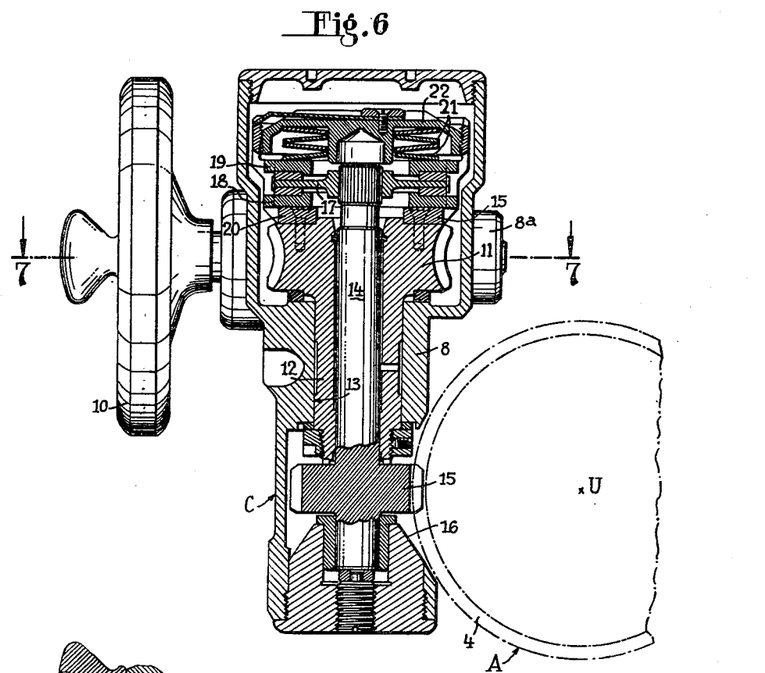
FIG. 6 is a longitudinal sectional view of the control device for the fine setting of the laying for elevation, this view being taken along line 6—6 of FIG. 1.
Figure 7:
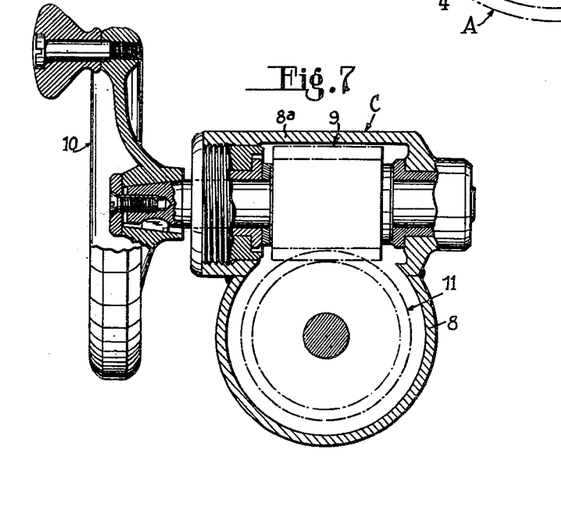
FIG. 7 is a sectional view taken along line 7—7 of FIG. 6.

The worm wheel 11 is connected by a friction clutch to the shaft 14 of a gear wheel 15 which extends through an opening 16 in the case and meshes with the screw threads 4 of the gun tube A.

This friction clutch is of the type having friction discs and comprises a metal driven disc 17 which is connected to the shaft of the gear 15 and clamped between two friction elements 18 and 19, the element 18 bearing against a ring 20 attached to the worm wheel 11. The clamping is effected elastically by a stack of elastic washers 21 and is regulatable by means of a nut 22 which bears against the washers. This clamping is so regulated that the maximum torque capable of being transmitted by the clutch is such that, on the one hand, no slip is possible in the course of the ordinary operations of laying the mortar for elevation and no undesired sliding of the collar occurs along the gun tube owing to the weight of the various elements, and, on the other hand, the gun tube A is capable of sliding in the collar B by causing slip of the clutch upon firing if the base plate K sinks into the ground thereby avoiding any alteration in the setting of the laying for elevation.

The collar B and the mortar laying device C are supported on the cradle support D.

Figure 8:
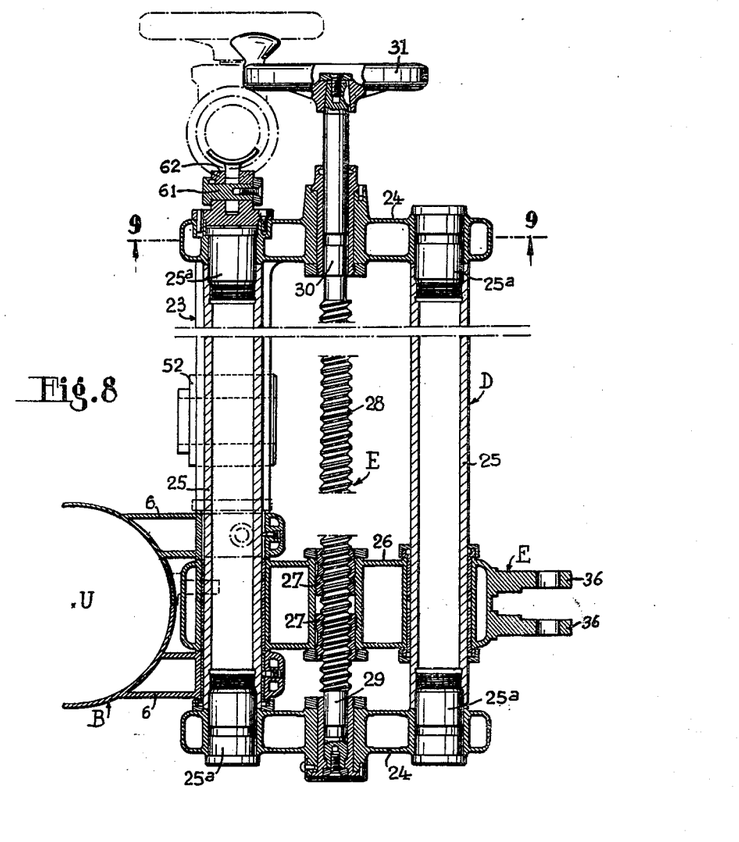
FIG. 8 is a sectional view taken along line 8—8 of FIG. 1 of the cradle of the carriage for the control device for laying the mortar for direction.
Figure 9:
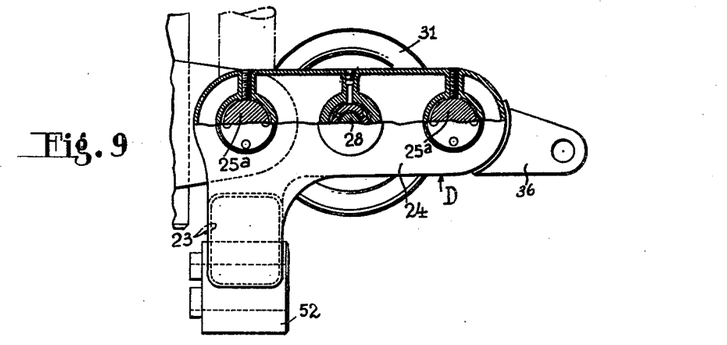
FIG. 9 is a half-elevational and half-sectional view taken along line 9—9 of FIG. 8.
Figures 10, 11:
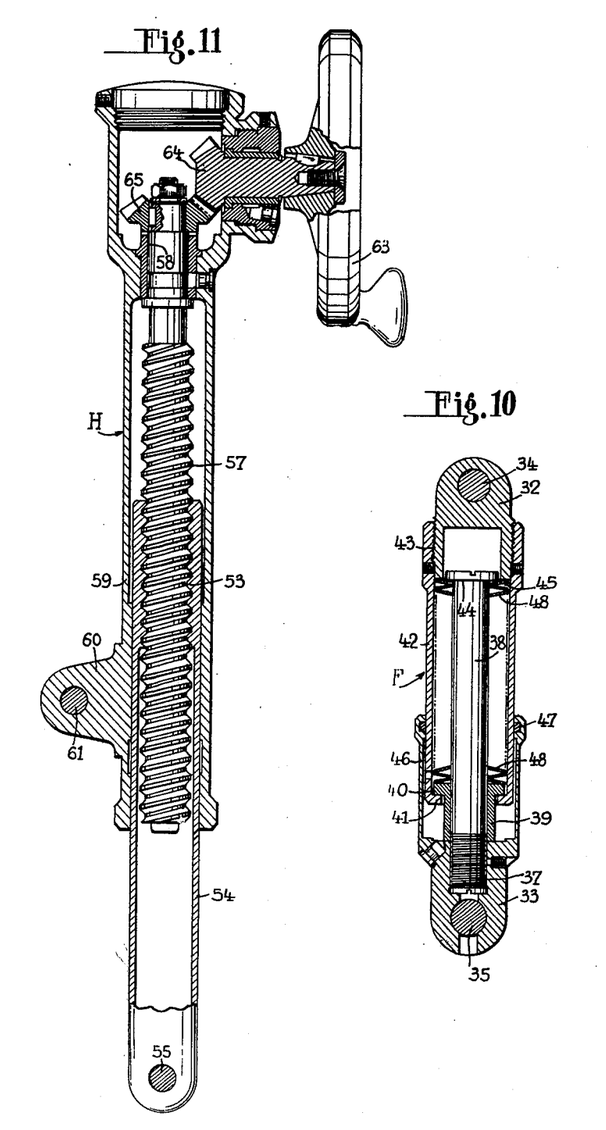
FIG. 10 is a sectional view of a disconnecting device for the connection between the collar and the cradle.
FIG. 11 is a sectional view of a control device for rendering the cradle horizontal.
Figure 15:
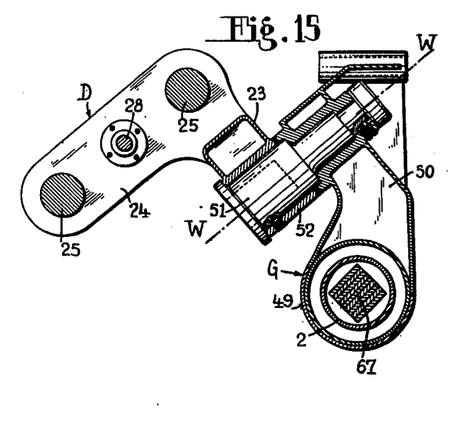
FIG. 15 is a similar sectional view taken along line 15—15 of FIG. 12 of the pivotal connection of the cradle on the part of the carriage in which the axle of the set of wheels is journalled.

The cradle support D (FIGS. 1 to 5 and 8, 9, 12, 15) comprises a rigid fork composed of a tubular cross-member 23 and two box-like side elements 24 which arrangement renders the fork L-shaped when viewed in side elevation (FIGS. 8, 9 and 15). This fork is reinforced by two parallel spacing tubes 25 fixed to the spigots 25a carried by the side elements 24 (FIGS. 9 and 10).

The collar B is pivoted by its lug 6 to one of the spacing tubes 25 and is capable of being moved transversely along this tube by means of the device E laying the mortar for direction.

The device E (FIGS. 2, 3, 8, 9 and 12) comprises a slide 26 movable along the two spacing tubes 25. This slide is inserted between the two lugs 6 of the collar B and carries a double nut 27 in which is screw-threadedly engaged a screw 28. The latter is journalled at 29 and 30 in the side elements 24 and carries at one end a handwheel 31 for laying for direction which it suffices to turn in one direction or the other to shift the collar B, and in consequence the tube A, transversely of the cradle D to the right or to the left.

The collar B, thus transversely movable relative to the cradle D, forms with the latter a triangulated system which is elastically deformable by means of the elastic disconnecting device F.

The disconnecting device F (FIG. 10) is so constructed that it can lengthen or shorten when the gun tube A tends to modify its angular position relative to the cradle D. This could occur, for example, upon firing owing to a rearward movement of the base plate K. In this way the stress on the tubes 25 of the cradle is decreased.

The device F comprises two heads 32 and 33 which are pivoted respectively by pins 34 and 35 in the fork 7 of the collar E (FIGS. 4 and 5) and in a fork 36 provided at the end of the transverse member 26 of the device E (FIGS. 4, 5, 8 and 9). Screw-threaded in the head 33 at 37 is a bolt 38 which carries slidable thereon a ring 39 which bears through the medium of a flange 40 against an inner flange 41 of a sleeve 42 screwed at 43 in the head 32. The sleeve 42 and the bolt 38 have such lengths that at rest the underside of the head 44 of the bolt is flush with the face 45 of the head 32 and the ring 39 bears against the head 33 in the bottom of the cavity formed by a protecting and water-tight sleeve 46 which upwardly extends the head 33 and is provided with a sealing ring 47 in which the sleeve 42 is slidable. A stack of elastic washers, partially shown at 48 in FIG. 10, is disposed around the bolt 38 and bears in the normal illustrated extended position against the faces 44 and 45 and against the ring 39.

When the distance between the pins 34 and 35, corresponding to the pivotal mounting of the disconnecting device F, tends to increase, the sleeve 42 moves outwardly of the tube 46 and the ring 39 moves nearer to the head of the bolt and compresses the elastic washers 48. On the other hand, when this distance tends to decrease, the sleeve 42 moves inwardly of the tube 46 and it is the upper head 32 which compresses the washers in moving toward the ring 39 which bears against the lower head 33.

The triangulated system thus obtained is composed of the collar B, cradle D and the disconnecting device F and is supported, through the medium of the cradle support G and the adjustable device H, by the set of wheels I.

The cradle support G (FIGS. 12 and 15) comprises a tubular element 49 to which is connected an arm 50 carrying a journal 51 having an axis W—W. Rotatably mounted on this journal is a sleeve 52 rigidly secured to the cross-member 23 of the cradle D; the latter is therefore capable of turning about the axis W—W.

The cradle is rendered horizontal transversely thereof by the adjusting device H (FIGS. 11 and 12), the cradle turning about the axis W—W for this purpose.

The adjusting device H comprises a link having a length which is adjustable by means of a screw and nut arrangement. The nut 53 (FIG. 11) constitutes the end of a first tube 54 which is pivoted to a fork 56 by a pin 55 (FIG. 12), this fork being secured to the tubular element 49. The screw 57 of the arrangement is journalled at 58 in a second tube 59 provided laterally with an outer lug 60 which is pivoted by a pin 61 to a fork 62 (FIGS. 8 and 12) provided at the end of the fork 24 of the cradle D. The screw 57 can be rotated by a handwheel 63 and a pair of bevel gears 64, 65 (FIG. 11).

Thus by rotating the handwheel 63, the transverse horizontality of the cradle D can be obtained irrespective of the inclination of the cradle support G whose element 49 has a position which depends on that of the set of wheels 1.

This set of wheels comprises (FIGS. 1 to 5 and 12 to 14) as mentioned hereinbefore, an axle 3 having an axis X—X formed by a tube mounted for rotation about the axis X—X through the medium of two bearing faces 66 in the element 49 of the cradle support G. The axle 3 comprises a set of torsion strips 67 centered in the axle 3 by two sleeves 68. Fixed to the ends of the strips are two arms 69 each of which carries at its free end the stub axle 70 of one of the support wheels 2 (FIGS. 4 and 5).

The supporting set of wheels I can be turned about the cradle support G about the axis X—X of the axle 3 by the device J which roughly lays the mortar for elevation.

To this end, there is welded to the axle 3 a sleeve 72 provided with outer fluting 72$^a$. Keyed to the latter by inner fluting 73$^a$ is a worm wheel 73 which meshes with a worm 74 which is rotatable by the handwheel 75 through the medium of gears 76 and 77 for the rough setting when laying for elevation. The worm 74 and the shaft 78 of the handwheel are journalled in a case 79 which is fixed at 80 (FIG. 12) to the tubular element 49 of the cradle support G and rests at 81 on the sleeve 73.

When transporting the mortar, it is advisable to relieve the teeth of the worm wheel 73 and the worm 74 from stress. To this end, a sliding collar 82 (FIGS. 12 and 14) is permanently engaged by inner fluting 82$^a$ with the outer fluting 49$^a$ provided on the end of the tubular element 49 and is capable of engaging the fluting 72$^a$ of the sleeve 72. It is constantly urged toward the left (as viewed in FIG. 12) that is, in the direction for locking, by a spring 83 and it can be retracted in opposition to the action of this spring by a shifting fork formed of two arms 84, a pin 85 and a lever 86 having a handgrip 87 that a spring 88 biases in the direction of arrow $f^2$ (FIG. 14) for the purpose of engaging a locking pin 89 carried by the handgrip (FIG. 12) in one or two notches 90 provided on a fixed member 91 for the purpose of holding the handgrip in position.

Figure 12:
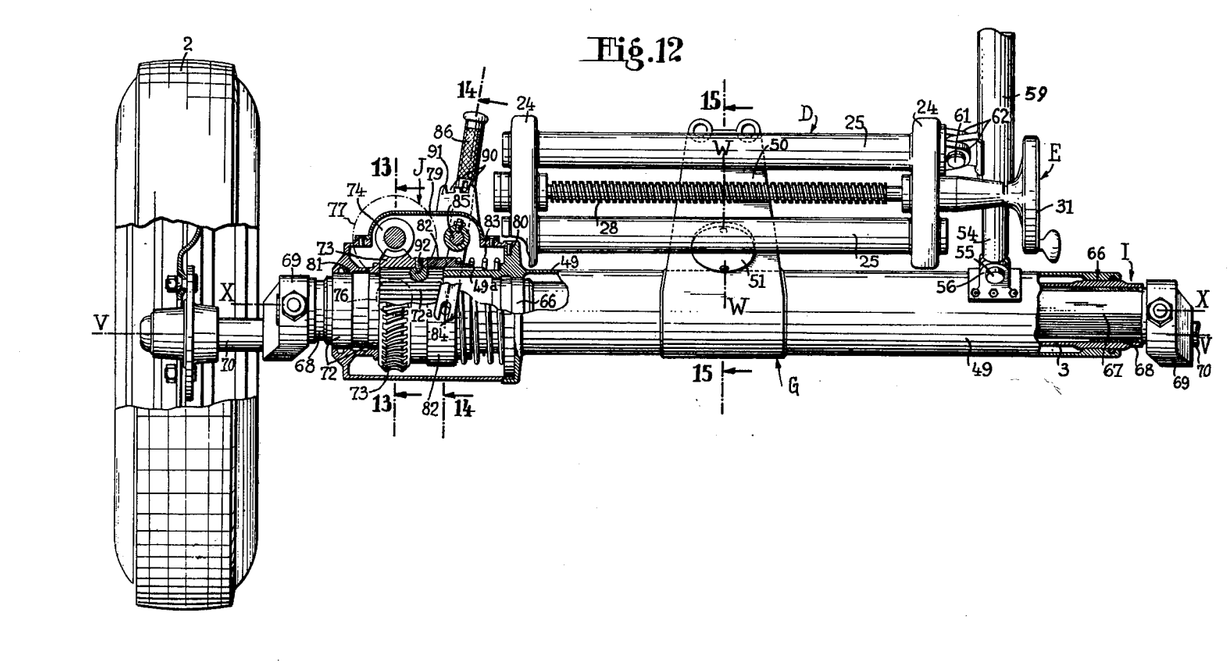
FIG. 12 is a view in the direction of arrow $f^1$ (FIG. 4), partly in section, of the assembly formed by the carriage and the set of wheels.
Figure 13:
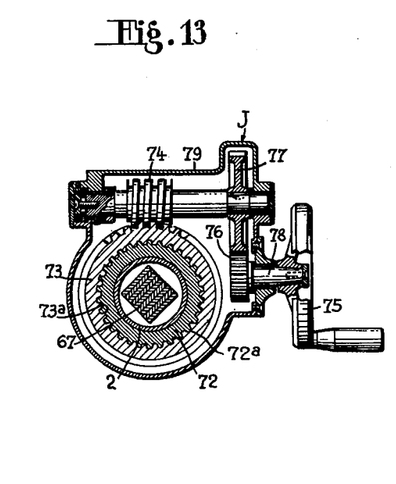
FIG. 13 is a sectional view on an enlarged scale taken along line 13—13 of FIG. 12 of the control device for roughly laying the mortar for elevation.
Figure 14:
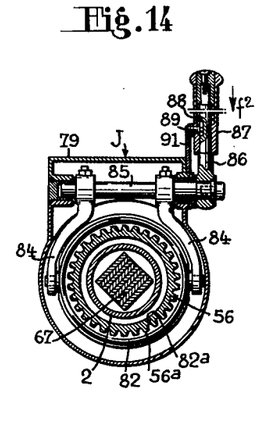
FIG. 14 is a similar sectional view taken along line 14—14 of FIG. 12 of the locking device for locking the set of wheels to the carriage.

In order to avoid an axial displacement of the worm wheel 73 along the fluting 72$^a$ of the sleeve 72 when the tube 82 is shifted toward the right, this worm wheel is fixed to the sleeve by a screw 92 (FIG. 12).

When the collar 82 rests against the worm wheel, the tubular element 49 is rigid with the sleeve 72 and the axle 3 and the torque due to the reaction of the wheels 2 does not stress the teeth of the worm and worm wheel. This is the mortar transporting position.

On the other hand, when the collar 82 is in the opposite position, in which it is unengaged with the fluting 72$^a$, it is possible to rotate the worm wheel 73 and the axle 3 about the axis X—X by means of the worm 74. This constitutes the rough setting when laying the mortar for elevation. The axis V—V of the wheels 2 thus describes a cylindrical surface about the axis X—X.

The interest of this device will be clear from a comparison of FIGS. 1 and 5. FIG. 1 shows the mortar in the firing position at a firing angle of 75° with the base plate K resting on the ground. The wheel-carrying arms 69 are downwardly inclined and the wheels 2 are therefore lowered and spaced away from the gun tube A so as to maintain the collar B away from the ground and improve the stability of the weapon. FIG. 5 shows the mortar in the firing position at 45° with the base plate sunk into the ground. The arms 69 are so directed that the collar B is as near as possible to the ground.

The combination of the two controls for laying for elevation—namely the rough setting obtained by rotation of the arms 69 and the fine setting obtained by the displacement of the collar B along the tube A—permits varying the angle of elevation from 30° to 90° while ensuring a good stability of the weapon and good conditions for laying for elevation in all azimuths, that is throughout the 360° of the horizon, owing to the base plate K and the swivel connection L to this base plate.

Figure 16:
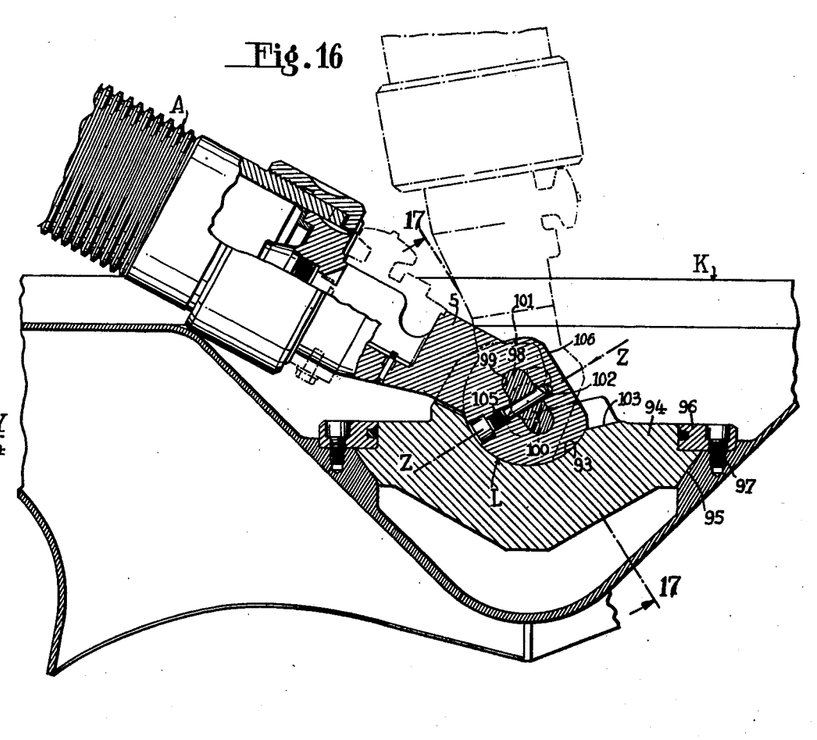
FIG. 16 is a longitudinal sectional view of the swivel mounting of the breech of the gun tube on the base plate.

As mentioned hereinbefore, the breech 5 of the tube A is connected to the base plate K by the part-spherical end L engaged in a part-spherical socket 93 provided in a detachable plate 94 which bears against the plate K through the medium of a part-conical face 95 and is held in position by a ring 96 secured by screws 97.

The torque to which the tube A is subjected by the projectile if it is rifled, is absorbed by a shaft 98 having an axis Y—Y which is engaged in an oblong aperture 99 formed in the breech ball end L and in round apertures 100 formed in two ears 101 integral with the detachable plate 94. These around apertures communicate with one of the faces of the ears by way of a slot 102 whose entrance has a width less than their diameter and equal to the width of the oblong aperture 99 in the ball L. The slots 102 are parallel with a flat face 103 formed on the plate 94.

Figure 17:
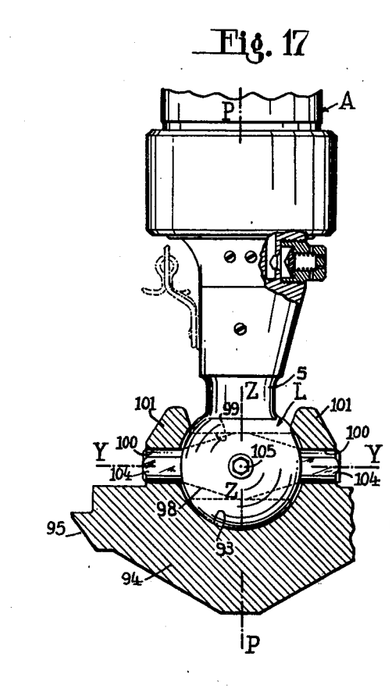
FIG. 17 is a view taken along line 17—17 of FIG. 16, the gun tube being shown in elevation with a part cut away in its position indicated by the dot-lash line in FIG. 16, and the base plate being shown partially in section.

The shaft 98 has a flat shape whose thickness equals the width of the oblong aperture and it comprises a central diamond-shaped portion (FIG. 17) disposed in the aperture 99 and two end portions each of which has a part-cylindrical cross-sectional shape and comprises two flat faces 104 the distance between which is very slightly less than the width of the slots 102. The shaft 98 is pivoted to the ball L by a screw 105 whose axis Z—Z (FIG. 16) is oblique and situated in the vertical plane P—P of symmetry of the base plate (FIG. 17).

The ball L comprises a flat face 106 parallel with the large faces of the aperture 99.

This arrangement permits very easily separating the gun tube A from the base plate K and assembling these elements. Thus, in order to introduce the ball L in the socket 93 of the plate 94, the gun tube A is presented in an inclined position relative to the base plate K so as to put the flat face 106 of the ball in contact with the flat face 103 of the plate 94. In this position the flat faces 104 of the shaft 98 permit engaging the latter in the slots 102 of the ears 101 of the plate 94. The tube A is thereafter swung about the axis Y—Y so as to bring it into the firing position; this position can make an angle of 30° to 90° relative to the base plate K.

The oblong shape of the aperture 99 combined with the diamond shape of the shaft 98 permits a certain oscillation of the gun tube about the axis Z—Z of the screw 105 in the plane normal to the plane of fire so as to permit regulating the out of true. In actual fact, the gun tube is connected to the plate by a universal joint having two orthogonal axes of rotation Y—Y and Z—Z.

The conicity and the diameter of the bearing face 95 of the plate 94 are so chosen as to provide a frictional torque which is such as to prevent rotation of the plate 94 relative to the base plate K upon firing (the coefficient of friction can even be a low one).

It should be noted that the gun tube A is freely rotatable in the collar B, which facilitates laying for direction during which the gun tube has a tendency to turn in this collar which precludes any reaction which could otherwise have been exerted by the tube on the cradle and on the gun carriage when the gun tube under the action of the projectile upon firing initiates a movement of rotation.

The gun laying apparatus or sight can be mounted by means of a dovetail assembly on the end of an arm fixed to the collar B.

Figure 18:
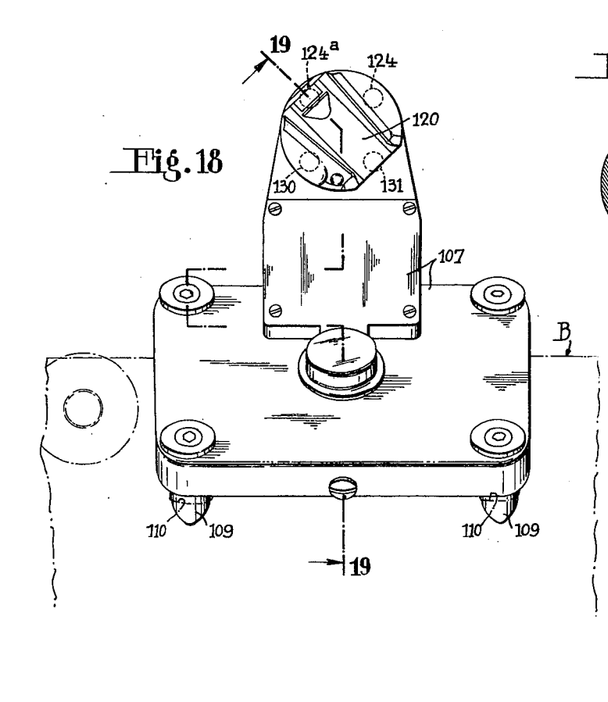
FIG. 18 is an elevational view of the support for the mortar laying apparatus.
Figures 19, 20:
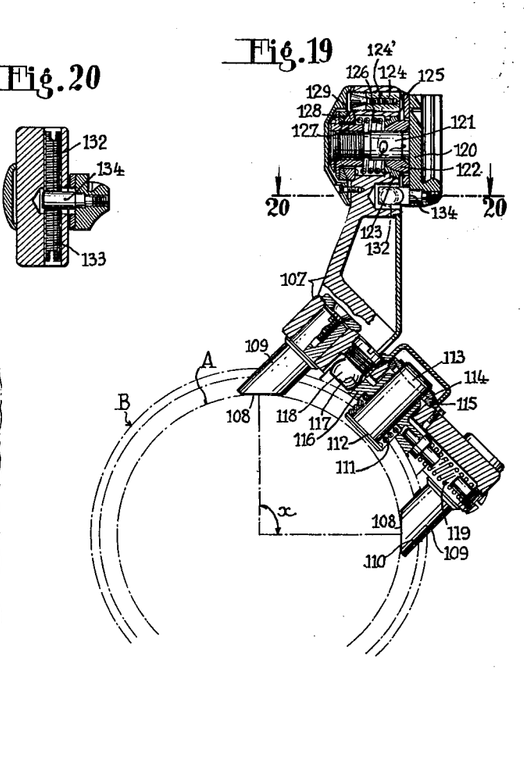
FIG. 19 is a sectional view taken along line 19—19 of FIG. 18.
FIG. 20 is a partial sectional view taken along line 20—20 of FIG. 19.

As it is necessary to provide a certain clearance between the collar B and the gun tube A to allow for heat expansion of the latter during firing if maximum gun laying precision is to be obtained, the gun laying apparatus is advantageously mounted in the manner shown in FIGS. 18 to 20 on a support arm 107 elastically applied against the tube A by four flat faces 108 which form therebetween in pairs a certain angle $x$ which is preferably roughly 90° (FIG. 19) and are provided on the ends of four studs 109 carried by said support arm and freely extending into holes 110 provided in the collar B. These studs 109 are applied through the medium of their faces 108 against the gun tube A by a spring 111 which bears against a washer 112 carried by one of the ends of a stud 113 whose other end bears by way of a part-spherical washer 114 and a conical washer 115 against the support arm 107. The stud 112 is slidable in a member 116 which is for example welded to the collar B. The member 116 comprises an aperture 117 in which is engaged the end (in the shape of an olive) of a screw 118 screwed into the support arm 107. This screw prevents the latter from turning about the axis of the stud 113 relative to the member 116 and the collar B.

A spring 119 permits taking up the lateral play between the collar B and the support arm 107 by applying the olive-shaped end of the screw 118 against the member 116.

The female part 120 of the dovetail arrangement adapted to support the mortar laying apparatus (not shown in the drawings) is mounted at the end of the support arm 107 in such manner as to permit a certain adjustment of the plane of sight so as to render it parallel with the plane of fire and to cause the angle of elevation of the mortar laying apparatus to coincide with the actual angle of elevation of the axis of the gun tube A.

The female part 120 of the dovetail arrangement is orientable owing to the provision of a stem 121 which carries this part 120, this stem being pivotable owing to the provision of a portion of a ball 122 which has a centre Q and is mounted in a part-spherical support face or socket formed in a cup 123 rigid with the support arm 107.

The appropriate position of the axis of the stem 121 is obtained by acting successively on screws 124, 130 and screws 124ª, 131 after having previously unscrewed one of the two screws 132, 133 the function of which will be explained hereinafter.

In the first action, the screws 124, 130 in contact with a plate 125 pivot the part 120 about the axis intersecting the points of contact between the screws 124ª 131 and this plate. By the second action, the screws 124ª, 131 pivot the part 120 about the axis intersecting the points of contact between the screws 124, 130 and the plate (this axis is perpendicular to the first-mentioned axis). During these adjustments, a spring 126 presses the dovetail part 120 against the plate 125 through a nut 127 screwed on the stem 121, a conical washer 128 and a part-spherical washer 129. The latter is centered in the support arm 107 so that during the adjustments the washer 128 slides on the washer 129 whose part-spherical face is concentric with the ball 122.

After the adjustment of the parallelism, the screws 124, 124ª, 130 and 131 are held stationary by means of conical screws such as 124' (FIG. 19) which spread apart the split ends of the adjusting screws.

The laying for elevation is thereafter regulated by acting on the aforementioned screws 132, 133 which are in contact with a shaft 134 rigid with the dovetail part 120 and these screws are held stationary by conical screws (not shown in drawings).

Finally, the dovetail part 120 is fixed in position by tightening the nut 127 until the washer 129 is applied against the support arm 107.

Figures 21, 22:
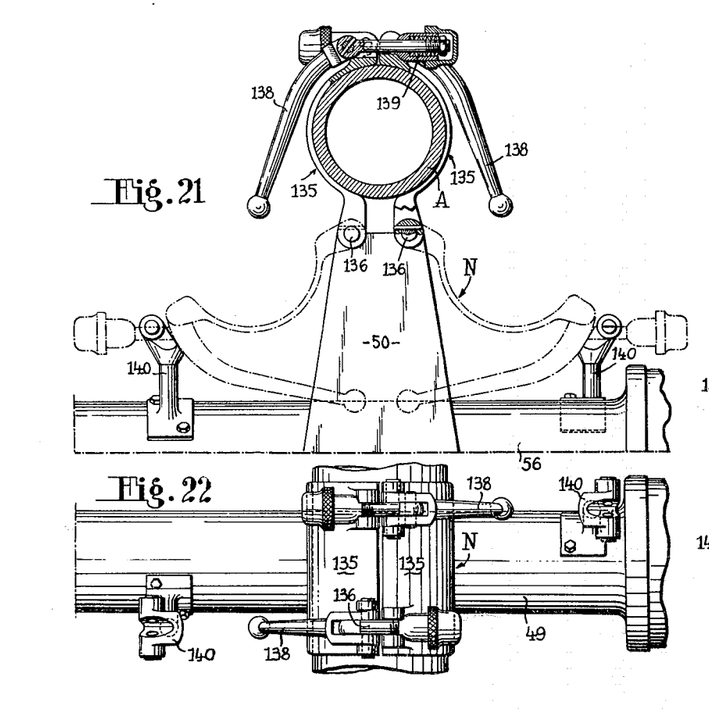
FIG 21 is a sectional view showing how the gun tube is fixed to the set of wheels in the transporting position.
FIG. 22 is a corresponding plan view thereof.

For road transport there is provided:

Firstly, a device N for fixing the gun tube to the transporting means (FIGS. 4, 21 and 22); the gun tube A is clamped on the tubular element 49 of the cradle support by two half-collars 135 which are pivoted at 136 to the arm 50 attached to the element 49. An elastic clamping is obtained by means of two levers 138 and springs 139, the levers resting against supports 140 when the tube A is free for firing.

Figures 23, 24, 25:
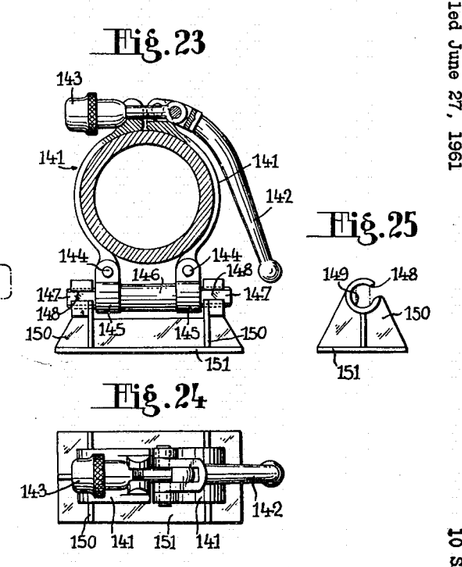
FIG. 23 is a cross-sectional view of the fixing device fixing the base plate to the gun tube in the transporting position.
FIG. 24 is a plan view of the half-collars of this device.
FIG. 25 is an end elevational view of the member fixing the base plate to the gun tube through the medium of the half-collars.

Secondly, a device O for fixing the base plate K to the gun tube A. The base plate K is supported by the gun tube through the medium of the socket in which is engaged the ball L (FIG. 4) and through the medium of two half-collars 141 (FIGS. 23 to 25) which are elastically clamped by a lever 142 and a spring (not shown in the drawings) disposed in a case 143. These levers are pivoted at 144 to collars 145 secured to a shaft 146 the ends of which latter are provided with flat faces 147 which permit engaging them through narrow entrances 148 into apertures 149 (FIG. 25) formed in ears 150 rigid with a plate 151 attached to the base plate.

Although specific embodiments of the invention have been described, many modifications and changes may be made therein without departing from the scope of the invention as defined in the appended claims.

Having now described my invention what I claim as new and desire to secure by Letters Patent is:

1. Mortar of the type having means for laying the gun tube for elevation and in which mortar the gun tube in the firing position rests on a base plate connected to the breech end of the gun tube and placed on the ground, and on a support device supporting the gun tube in a region intermediate the ends of the gun tube, said support device comprising a carriage assembly on which the gun tube is mounted to be unadjustable in angular position in the plane of fire relative to the carriage assembly, and a set of supporting wheels for resting on the ground and connected to the carriage assembly in such manner as to be movable relative to the carriage assembly in a path affecting the angle of elevation of the gun tube, said means for laying the gun tube for elevation consisting of a control device mounted on the carriage assembly and operatively connected to the wheels for adjusting and maintaining the wheels in any selected position in said path.

2. Mortar as claimed in claim 1, wherein the gun tube is axially movable relative to the carriage assembly.

3. Mortar as claimed in claim 1, wherein said path is such that the wheels are disposed nearer to the gun tube when the latter is laid at small angles of elevation than when the gun tube is laid at large angles of elevation, so that the mortar has high stability on the ground in high angles of fire of the gun tube.

4. Mortar as claimed in claim 1, wherein the wheels are mounted on the carriage assembly by means comprising a tubular element forming part of the carriage assembly, an axle rotatively mounted in the tubular element, and support arms secured to the ends of the axle and carrying the wheels.

5. Mortar of the type having means for laying the gun tube for elevation and means for laying the gun tube for direction and in which mortar the gun tube in the firing position rests on a base plate connected to the breech end of the gun tube and placed on the ground, and on a support device supporting the gun tube in a region intermediate the ends of the gun tube, said support device comprising a carriage assembly having a collar in which the gun tube is axially slidably mounted, a cradle on which the collar is mounted to be unadjustable as concerns angular movement relative to the cradle, a set of supporting wheels for resting on the ground and connected to the carriage assembly in such manner as to be movable relative to the carriage assembly in a path affecting the angle of elevation of the gun tube, said means for laying the gun tube for elevation consisting of a first control device mounted on the carriage assembly and operatively connected to the wheels for adjusting and maintaining the wheels in any desired position in said path, said means for laying the gun tube for direction being mounted on the carriage assembly and operatively connected to the gun tube to be operative irrespective of the position of the wheels in said path, said mortar further comprising a second control device operatively interconnecting the collar and the gun tube for holding the gun tube in the desired axial position in the collar and constituting a fine-setting device for laying the gun tube for elevation.

6. Mortar as claimed in claim 5, wherein said second control device comprises in said operative connection between the collar and the gun tube a friction clutch which is normally operative to hold the gun tube in axial position in the collar when firing but which slips and permits the gun tube to slide in the collar in the event of the base plate sinking further into the ground thereby avoiding subsequent alteration in the lay of the gun tube for elevation.

7. Mortar of the type having means for laying the gun tube for elevation and in which mortar the gun tube in the firing position rests on a base plate connected to the breech end of the gun tube and placed on the ground, and on a support device supporting the gun tube in a region intermediate the ends of the gun tube, said support device comprising a carriage assembly having a collar mounted on the gun tube, a cradle, a pivotal connection between the cradle and collar to permit the collar to pivot in the plane of fire of the gun tube, and an elastically yieldable device having one end pivoted to the collar and the other end pivoted to the cradle at pivot points other than said pivotal connection so as to constitute a triangulated articulated assembly in said plane of fire, the yieldable device acting to hold the collar in position relative to the cradle in said plane of fire but yielding and permitting a slight damped movement of the gun tube relative to the cradle upon firing so as to limit the maximum torque to which the cradle and in consequence the carriage assembly is liable to be subjected in the event of a large displacement of the base plate, said support device further comprising a set of supporting wheels for resting on the ground and connected to the carriage assembly in such manner as to be movable relative to the carriage assembly in a path affecting the angle of elevation of the gun tube, said means for laying the gun tube for elevation consisting of a control device mounted on the carriage assembly and operatively connected to the wheels for adjusting and maintaining the wheels in any desired position in said path.

8. Mortar as claimed in claim 7, wherein the gun tube is slidable axially in the collar, friction means being provided for interconnecting the gun tube and the collar and preventing axial movement of the gun tube in the collar which friction means is normally operative to hold the gun tube in axial position in the collar when firing but which slips and permits the gun tube to slide in the collar in the event of the base plate sinking further into the ground thereby avoiding subsequent alteration in the lay of the gun tube for elevation.

9. Mortar of the type having means for laying the gun tube for elevation and in which mortar the gun tube in the firing position rests on a base plate connected to the breech end of the gun tube and placed on the ground, and on a support device supporting the gun tube in a region intermediate the ends of the gun tube, said support device comprising a carriage assembly having a collar in which the gun tube is mounted, a cradle on which the collar is mounted to be unadjustable in angular position in the plane of fire but free to move along the cradle transversely of the carriage assembly, and a device operatively interconnecting the collar and the cradle for adjusting the position of the collar on the cradle transversely of the carriage assembly and constituting a device for laying the gun tube for direction, said support means further comprising a set of supporting wheels for resting on the ground, arms pivotally mounted on the carriage assembly and carrying the supporting wheels, said means for laying the gun tube for elevation consisting of a control device mounted on the carriage assembly and operatively connected to the arms for adjusting the arms in any selected position between extreme positions and holding the arms in the selected position.

10. Mortar as claimed in claim 9, wherein the carriage assembly comprises a cradle support, a pivotal connection between the latter and the cradle to permit the cradle to pivot about an axis contained in the vertical longitudinal plane of symmetry of the carriage assembly and inclined to the vertical in said plane in all angles of elevation of the gun tube for firing, connecting means of adjustable length interconnecting the cradle support and the cradle at points other than said pivotal connection so as to permit insuring at all times that the cradle is horizontal transversely of the carriage assembly.

11. Mortar as claimed in claim 10, wherein said cradle support comprises a tubular element, and said arms are mounted on the carriage assembly by an axle secured to the arms and rotatively mounted in the tubular element.

12. Motar as claimed in claim 11, where said control device adjusting the position of the wheels comprises a handwheel, a worm rigid with the handwheel and mounted on said cradle support and a wormwheel rigid with said axle and meshing with the worm.

13. Motar as claimed in claim 12, comprising a releasable locking device interposed between the axle and the tubular element for locking the axle against rotation in the latter when transporting the mortar.

14. Mortar as claimed in claim 1, wherein said connection between the gun tube and base plate is a ball and socket joint which comprises a cross-shaft which is held in position relative to the base plate and extends through the ball and has a cross-section including flat parallel sides which engage flat parallel faces provided on the ball and positively maintains the ball stationary as concerns rotation of the ball about the axis of the gun tube relative to the base plate, the cross-shaft being pivotable relative to the ball about an axis which is perpendicular to said flat sides and inclined relative to the axis of the gun tube thereby permitting a transverse oscillation of the gun tube for the purpose of correcting any out of true.

15. Mortar as claimed in claim 14, wherein the gun tube is mounted on the carriage assembly for rotation about the axis of the gun tube.

16. Mortar as claimed in claim 14, wherein said socket is formed in a detachable plate which bears against the base plate through the medium of a part-conical face which insures that the detachable plate is maintained stationary as concerns rotation relative to the base plate.

17. Mortar as claimed in claim 16, wherein a flat face provided on the ball permits a rapid insertion and locking of the ball in the socket in combination with a corresponding flat face in the detachable plate, said flat faces when in contact with each other resulting in such relative positions between the ball and the detachable plate that the flat sides on said cross-shaft are in position for passage through entrances provided in ears formed on the detachable plate for the rotatable mounting of the cross-shaft.

18. Mortar as claimed in claim 5, comprising a mortar sight, a support carrying the mortar sight and having flat bearing faces extending in two parallel planes which are convergent transversely of the gun tube, means interconnecting said sight support and the collar so that said planes are held parallel with the gun tube, and means interposed between the collar and said sight support for biasing the bearing faces against the gun tube, whereby the sight support is always held in direct contact with the gun tube.

19. Mortar as claimed in claim 18, comprising a dovetail arrangement for securing the motar sight to the sight support, ball and socket means interconnecting the dovetail arrangement to the sight support, and adjusting screws for adjusting the angular position of the dovetail arrangement relative to the sight-support.

20. Mortar as claimed in claim 19, comprising releasble clamping means operatively interconnecting the ball and the socket of the ball and socket means for releasably locking the ball and socket means for releasably locking the ball and socket in their relative position after having adjusted the position of the dovetail arrangement by means of the adjusting screws.

21. Mortar as claimed in claim 1, comprising openable half-collars pivoted to the carriage assembly and combined with quick-acting spring-loaded locking levers, said half-collars being adapted to be clamped round the gun tube by said locking levers for holding the gun tube stationary on the carriage assembly for transport, and similar openable half-collars detachably pivoted to the base plate and quick-acting spring-loaded levers combined with the last-mentioned half-collars for clamping the latter round the gun tube and holding the base plate stationary relative to the gun tube for transport.

References Cited in the file of this patent

UNITED STATES PATENTS

| | | |
|---|---|---|
| 2,182,010 | Brandt | Dec. 5, 1939 |
| 2,325,560 | Wauters | July 27, 1943 |
| 2,478,898 | Darr et al. | Aug. 16, 1949 |
| 2,566,393 | Wolfe | Sept. 4, 1951 |